Jan. 3, 1956  G. GORHAM ET AL  2,729,221
SAFETY DEVICE FOR GAS BURNING APPLIANCES
Filed Sept. 12, 1950  2 Sheets—Sheet 1
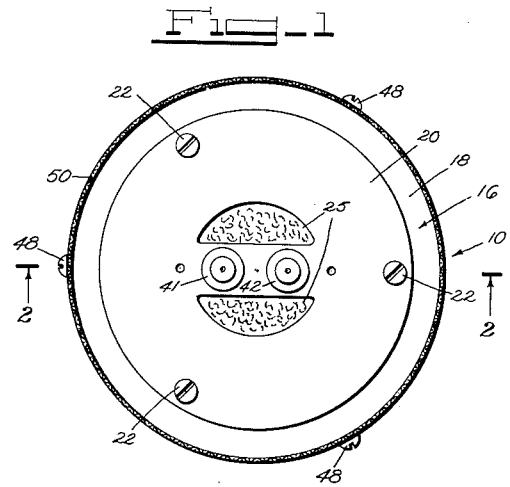
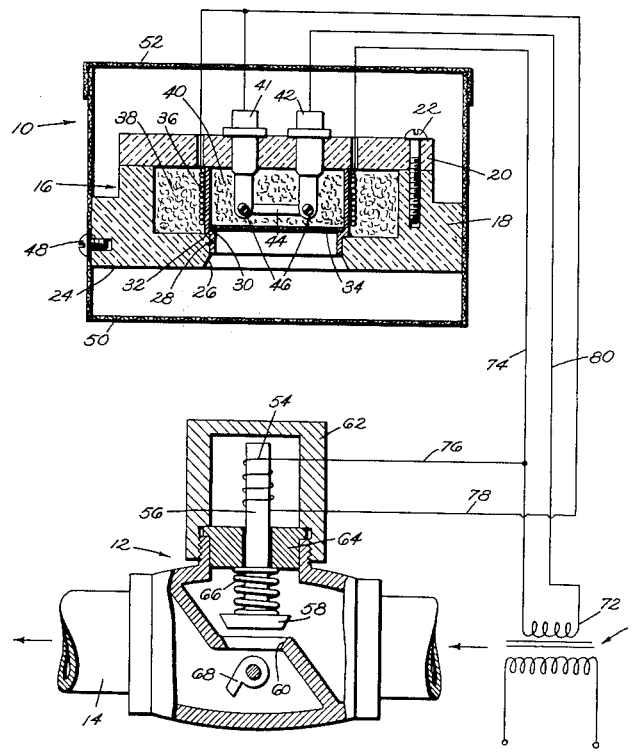
INVENTORS.
GEORGE GORHAM AND
IGNACE GRAGEROFF
BY Edwin Leveson +
Harry Cole
ATTORNEYS Jan. 3, 1956  G. GORHAM ET AL  2,729,221
SAFETY DEVICE FOR GAS BURNING APPLIANCES
Filed Sept. 12, 1950  2 Sheets-Sheet 2

INVENTORS.
GEORGE GORHAM AND
IGNACE GRAGEROFF
BY Edwin Levison +
Harry Cole
ATTORNEYS

United States Patent Office 2,729,221
Patented Jan. 3, 1956

2,729,221
SAFETY DEVICE FOR GAS BURNING APPLIANCES

George Gorham and Ignace Grageroff, New York, N. Y.

Application September 12, 1950, Serial No. 184,414

9 Claims. (Cl. 137—76)

The present invention relates to safety devices to prevent loss of life or personal injury or property damage which might otherwise be caused by escaping gas, especially in the home, but not limited in use thereto, for example by gas escaping from a gas stove.

One object of the invention is to provide a device which is of simple construction and reliably operable to shut off the supply of gas to a gas stove or other gas burning appliance when unburned gas escapes in a kitchen or other room or space.

Another object is to provide a gas shut-off device which is operable automatically in response to the presence of unburned gas and which is of such character as to require manual re-setting in order to allow the supply of gas to be resumed after it is turned off by said automatic operation of the device.

Another object is to provide a safety device of the character in which a catalyst, platinum sponge, for example, is employed to raise the temperature of the unburned gas for operating the device, with means to prevent "poisoning" of the catalyst.

Another object is the provision of means for varying the operating characteristics of said device whereby the latter may be set to operate upon the escape of a predetermined quantity of gas.

The above and other objects, features and advantages of the present invention will be more fully understood from the following description considered in connection with the accompanying illustrative drawings.

In the drawings:

Fig. 1 is a top plan view of a safety device embodying the present invention, the cover of the enclosure being removed;

Fig. 2 is a composite view including a sectional view taken on the line 2—2 of Fig. 1, a sectional view, partly diagrammatic, of an electrically operated or solenoid valve, and a diagrammatic illustration of the electric wiring.

Figure 3:
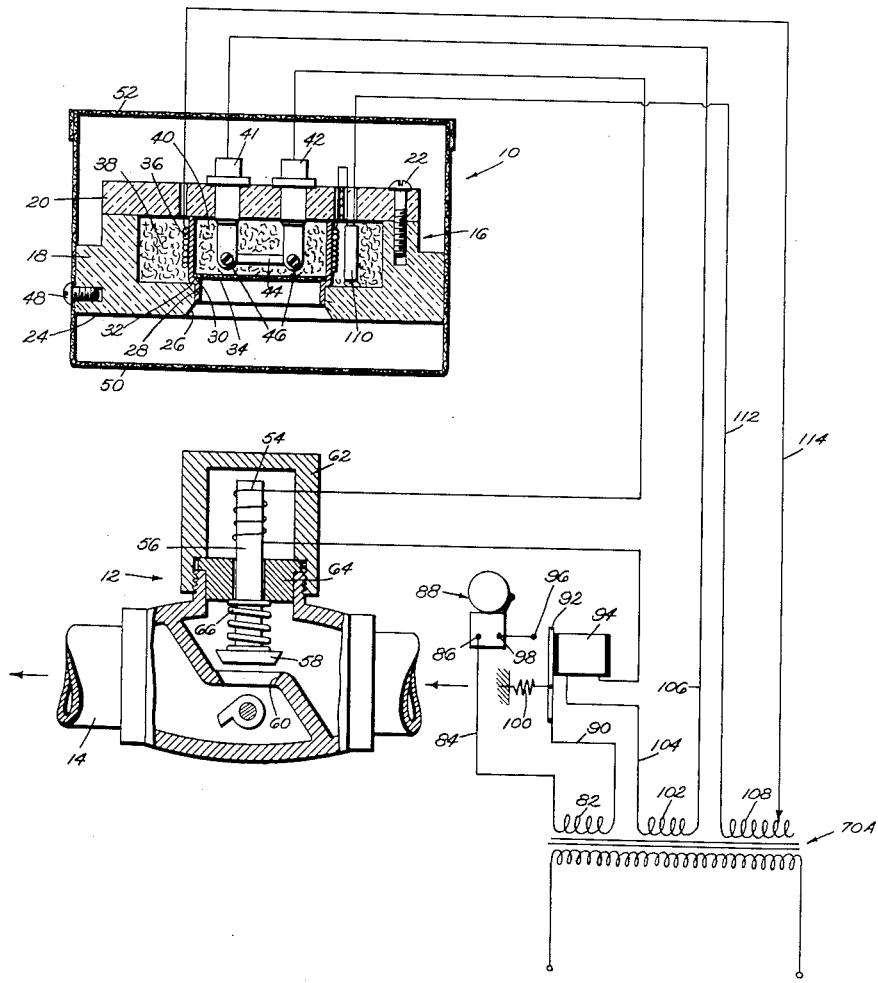
Fig. 3 is a view similar to Fig. 2 showing another form of the apparatus.

Referring now to Figs. 1 and 2 of the drawings in detail, there is shown a gas safety device 10 which, upon the escape of a quantity of unburned gas from a supply line or from a gas burning appliance (not illustrated) such as a kitchen gas range, a gas heater, etc. operates to interrupt an electrical circuit connected to a gas valve 12 mounted in a gas supply line 14 of a gas appliance for shutting off the supply of gas thereto.

As here shown, the gas device 10 comprises a container or housing 16 preferably formed of a suitable ceramic material and constituted by a hollow body portion 18 and a cover 20 secured thereto in any suitable manner, as by the screws 22. The bottom wall 24 of said body portion is centrally apertured, as at 26. A heat-conducting cylinder 28, formed of a suitable metal, is mounted centrally of the body 18, one end extending into said aperture 26. Said cylinder is inwardly flanged as at 30, said flange being seated on the cooperating portion 32 of bottom wall 24. The other end of the cylinder underlies the centrally slotted portions 25 of cover 20. A foraminous or perforated member 34, preferably formed of wire cloth, is seated on the flange 30, as illustrated in Fig. 1. The cylinder is surrounded by an electric heating coil 36 which, in turn, is surrounded by heat-insulator material 38, such as glass wool or other suitable material. The cylinder 28 forms a chamber in the housing and contains a suitable oxidizing agent or a catalyst 40 deposited on the member 34 and substantially filling the portion of the cylinder thereabove. Catalyst 40 is preferably platinum and, in order to provide for the most active form of said catalyst, we prefer to use platinum sponge which is deposited on fine, dry, short, very pure asbestos fibers in order to present a greatly enlarged surface for contact with gaseous mixtures. Other catalysts, for example, copper oxide may be used. However, we prefer catalysts which are effective at a temperature below the ignition temperature of the gas-air mixtures. Platinum sponge meets this requirement.

Electrical terminal members 41 and 42 are mounted in the cover 20 between slots 25 and extend into the cylinder 28. Thermally-responsive means, here shown as fuse 44, formed of a suitable low melting alloy is removably connected across the ends of said terminal members in any suitable manner, as by the screws 46, said fuse being positioned in heat-exchange relation with the platinized asbestos catalyst. The housing 16 is secured by screws 48 in a foraminous or other perforated enclosure 50 provided with a cover 52, said enclosure and cover both being preferably formed of wire gauze or cloth. The device 10 is preferably mounted on the wall or on some other suitable support (not shown) in the room, for example the kitchen, in which the gas appliance is located.

The solenoid valve 12 may be of any suitable type. As here shown, gas valve 12 comprises a solenoid coil 54, the plunger 56 mounted axially of the coil for movement thereby and provided at one end thereof with the valve member 58 which, when disposed on the valve seat 60, closes the valve and stops the flow of gas through the gas supply line 14 in which the valve is mounted. The valve body is provided with the housing 62 in which the solenoid 54 is disposed, said housing preventing the escape of gas from the solenoid portion of the valve. It will be noted that the plunger 56 is mounted for movement through an apertured valve cap 64. A spring 66 is mounted on said plunger between the valve member 58 and said cap 64, to close the valve when the winding 54 is deenergized. The valve is also provided with a manual reset arm 68. Member 68 for opening the valve may be omitted or when provided said member may be sealed in retracted position so as to prevent unauthorized opening of said valve.

It will be understood that the wire gauze enclosure 50 provides cooling means to prevent the heat generated in housing 16 from igniting the unburned gas in the ambient atmosphere externally of the enclosure.

The device 10 and the controlled valve 12 are connected in a control circuit to a source of electric energy through the step-down transformer 70. The secondary winding 72 of the transformer is connected through lead 74 to one end of the heating coil 36. A lead 76 connects the lead 74 to one end of the solenoid coil 54, the other end of said coil being connected by lead 78 to the other end of heating coil 36 and to the terminal member 41. Lead 80 connects the other end of the secondary winding to terminal member 42, the terminal members being bridged by fuse 44. The circuit through coil 54 is traced from secondary 72 through lead 74 to lead 76, through coil 54 to lead 78, to terminal member 41 through fuse 44 to terminal member 42 and through lead 80 back to the secondary 72. The circuit through heating coil 36 is traced from secondary 72 through lead 74 to coil 36, through the coil to lead 78 to terminal 41 and back to the secondary as in the circuit for coil 54. When the transformer 70 is energized, the solenoid coil 54 is energized through the described circuit and, when so energized, the plunger 56 is retained in the retracted position thereof, as illustrated, against the bias of spring 66. In said condition of the plunger, the valve is open and gas is free to flow through pipe 14 in the direction of the arrows shown in Fig. 2.

When a mixture of air and illuminating gas enters enclosure 50 and flows through slots 25 and aperture 26 into cylinder 28, said mixture comes in contact with the catalyst material 40, which is maintained at an elevated temperature by the heating coil 36, and heat is thereby generated and raises the temperature of the catalyst material 40. In order to prevent the contamination or poisoning of the catalyst by the condensation of water vapor, or due to the presence of fats and fatty or oily substances normally present in a kitchen, the temperature of the catalyst material 40 is normally maintained above the boiling point of water by heater 36. We prefer to maintain the catalyst at a temperature of about 300° F. Under such conditions, the contact of illuminating gas and air mixture causes the temperature of the catalyst to rise considerably. In the event that either natural or manufactured gas escapes from a gas burner or from a leak in the supply line 14, an air and gas mixture will enter the cylinder 28, as described, the platinum sponge condensing on its surface the oxygen in said mixture, heat being developed by the interaction which takes place between the substances with great speed at the surface of the platinum sponge, and causing the temperature of the catalyst to rise. When said resultant temperature reaches the melting point of the fuse 44, the latter will melt and open the circuit, controlled thereby, between the terminals 41 and 42. Since said fuse is in series circuit with the solenoid coil 54, the latter will be de-energized and plunger 56 will be carried downwardly by spring 66 to close the valve and interrupt the flow of gas through the supply line 14. It will also be noted that said fuse is in series circuit with the heating coil 36 so that the latter is also de-energized upon the opening of said fuse. The supply of gas through the burner will remain cut off unless the valve 58 is opened by means of the manual reset arm 68 or by replacement of fuse 44. It will be noted that due to the step-down transformer, fuse 44 is in a normally low voltage circuit so that it may be safely replaced without disconnecting the transformer from the power supply. When the fuse is replaced, the circuits of both the heating coil 36 and solenoid coil 54 are restored, the latter retracting the plunger 56 and permitting the flow of gas through supply line 14.

In the embodiment illustrated in Fig. 3, means are provided for operating a signal, preferably an audible signal or alarm when gas escapes. In this connection the transformer 70A is provided with a secondary winding 82 having the lead 84 connected to the terminal 86 of the signal bell 88. The other side of secondary 82 is connected by lead 90 to the armature 92 of relay 94. Armature 92 is adapted to engage contact 96 which is connected to terminal 98 of bell 88 for energizing the latter. With relay 94 in energized condition, armature 92 is retained disengaged from contact 96 against the tension of spring 100. Relay 94 and solenoid 54 are both connected in series in line 104 which connects one end of secondary 102 to terminal 42. The circuit is completed to the other end of secondary 102 through the fuse 44, terminal 41 and lead 106. It will be understood that when the fuse 44 is caused to melt by the added heat resulting from the oxidation of the gas mixture in the presence of the catalyst 40, the cricuit through the secondary 102 is interrupted whereby coil 54 is de-energized to close valve 12, as heretofore described, and relay 94 is also de-energized whereby armature 92 is moved by spring 100 into engagement with contact 96 to complete the circuit through bell 88 and the latter will continue to ring until the transformer 70A is disconnected from the power supply or until the fuse 44 is replaced. It will be understood that the aural alarm 88 may be replaced by any suitable visual alarm or that a visual alarm may be used in addition to alarm 88. In addition to indicating that the supply of gas to the appliance has been discontinued, the alarm will serve to indicate the presence of unburned gas in the room. It will be understood that under certain conditions the signal device might be used without the gas shut-off device, for example under circumstances where a signal is considered a sufficient safeguard; and under such conditions the solenoid valve may be omitted.

Transformer secondary 108 supplies the energy for the heating coil 36. It will be noted that said secondary is of the variable type to regulate the current flow through said coil and the heat generated thereby. Under certain conditions it may be desirable to have the apparatus 10 operate immediately upon the escape of a small quantity of unburned gas. Under these circumstances, the secondary 108 will be adjusted to supply a greater amount of heat to the catalyst 40 so that only a small quantity of gas will generate the additional heat necessary to melt fuse 44. However, where it is desired that the apparatus does not operate until a greater quantity of unburned gas has escaped, the secondary 108 will be adjusted to provide a lower operating temperature for coil 36 and thereby require a greater amount of gas to raise the temperature of the catalyst sufficiently to melt the fuse. The latter will be the normal operating condition in a kitchen where, when only a small amount of gas escapes into the room, for example due to overflow from a cooking utensil extinguishing a gas burner, it is not required that the gas supply be shut off immediately thereafter, but only after a greater amount of gas has escaped into the room.

In order to provide for maintaining the temperature generated by heating coil 36 at a pre-set level, for example at about 300° F. to prevent condensation of moisture on the catalyst, a thermostat 110 may be inserted in the circuit between said secondary and the heating coil. As illustrated in Fig. 3, the thermostat 110 is disposed in the housing 16, adjacent heater 36, being connected in series to lead 112 which is connected between secondary 108 and one side of the heating coil, the other side of the heating coil being connected by line 114 to the secondary 108. The thermostat is preferably of the bi-metallic type and preferably is provided with means for varying the setting thereof. Therefore, when the heat generated by the heater rises above a predetermined desired operating temperature thereof, the thermostat will be effective to discontinue the energization thereof, in a manner well known to those skilled in the art.

It will be understood that the apparatus of the present invention may be used to detect the presence of both manufactured and natural forms of illuminating and heating gas.

While we have shown and described the preferred embodiment of our invention, it will be understood that various changes may be made in the present invention without departing from the underlying idea or principles of the invention within the scope of the appended claims.

Having thus described our invention, what we claim and desire to secure by Letters Patent, is:

1. A safety device of the character described, operable in response to the generation of heat resulting from the oxidation of heating or illuminating gas in the presence of a catalyst, comprising a container for said catalyst having provision for exposing the catalyst to escaping gas, fusible means positioned in heat exchange relation with said catalyst, and an electric flow control circuit including said fusible means so as to be normally completed, under the control of said fusible means, and so as to be interrupted under the control of said fusible means pursuant to the evolution of heat in said catalyst, and an electric heater for heating the catalyst independently of the action of said gas to a temperature which is high enough to prevent the condensation of moisture on said catalyst but which is below the ignition temperature of the gas.

2. A safety device of the character described, operable in response to the generation of heat resulting from the oxidation of heating or illuminating gas in the presence of a catalyst, comprising a container for said catalyst having provision for exposing the catalyst to escaping gas, fusible means positioned in heat exchange relation with said catalyst, and an electric control circuit including said fusible means so as to be normally completed, under the control of said fusible means, and so as to be interrupted under the control of said fusible means pursuant to the evolution of heat in said catalyst, and an electric heater for heating the catalyst independently of the action of said gas to a temperature which is high enough to prevent the condensation of moisture on said catalyst but which is below the ignition temperature of the gas, said fusible means being in circuit with said heater whereby said heater circuit is normally completed under the control of said fusible means and interrupted under the control of said fusible means pursuant to said evolution of heat in the catalyst.

3. A safety device of the character described, operable in response to the generation of heat resulting from the oxidation of heating or illuminating gas in the presence of a catalyst, comprising a container for said catalyst having provision for exposing the catalyst to escaping gas, fusible means positioned in heat exchange relation with said catalyst, and an electric flow control circuit including said fusible means so as to be normally completed, under the control of said fusible means, and so as to be interrupted under the control of said fusible means pursuant to the evolution of heat, and an electric heater for heating the catalyst independently of the action of said gas to a temperature which is high enough to prevent the condensation of moisture on said catalyst but which is below the ignition temperature of the gas, and thermostatic means in heat exchange relation with said catalyst and operatively connected in the circuit of said electric heater to control the energization of said heater circuit.

4. A safety device of the character described, operable in response to the generation of heat resulting from the oxidation of heating or illuminating gas in the presence of a catalyst, comprising an insulated container for said catalyst, said container having a chamber in which the catalyst is disposed and an opening to said chamber for exposing the catalyst to escaping gas, fusible means positioned in heat exchange relation with said catalyst, and an electric flow control circuit including said fusible means so as to be normally completed, under the control of said fusible means, and so as to be interrupted under the control of said fusible means pursuant to the evolution of heat in said catalyst, said catalyst chamber having a heat-conductive wall encompassing said catalyst, and an electric heater disposed in said container in juxtaposition to said wall for heating the catalyst independently of the action of said gas to a temperature which is high enough to prevent the condensation of moisture on said catalyst but which is below the ignition temperature of the gas.

5. A safety device of the character described, operable in response to the generation of heat resulting from the oxidation of heating or illuminating gas in the presence of a catalyst, comprising a heat insulated housing apertured in opposing portions thereof to provide a passageway therethrough, an open-ended cylinder in which the catalyst is disposed, said cylinder being mounted in said passageway in communication with said apertured portions for exposing the catalyst to escaping gas, thermally responsive means positioned in said cylinder in heat exchange relation with said catalyst, and an electric flow control circuit associated with said thermally responsive means so as to be normally completed, under the control of said thermally responsive means, and so as to be interrupted under the control of said thermally responsive means pursuant to the evolution of heat in said catalyst, said cylinder being heat conductive, and an electric heater disposed in said housing in juxtaposition to said cylinder for preheating the catalyst independently of the action of said gas, said thermally-responsive means being a fusible member included in said control circuit.

6. A safety device of the character described comprising a gas system including a flow control valve connected between a gas supply and a gas utilizing device, means biasing said valve to the closed position thereof to discontinue the flow of gas between said supply and said device, a normally energized control circuit including electromagnetic means for retaining said valve in the open position thereof, fusible means in series circuit with said electromagnetic means, and means for exposing a catalyst to escaped gas from said system, said fusible means being disposed in heat exchange relation with said catalyst, said catalyst evolving sufficient heat in the presence of escaped gas to destroy said fusible means whereby to interrupt said control circuit to close said valve.

7. A safety device of the character described comprising a gas system including a flow control valve connected between a gas supply and a gas utilizing device, means biasing said valve to the closed position thereof to discontinue the flow of gas between said supply and said device, a normally energized control circuit including electromagnetic means for retaining said valve in the open position thereof, fusible means in series circuit with said electromagnetic means, and means for exposing a catalyst to escaped gas from said system, said fusible means being disposed in heat exchange relation with said catalyst, said catalyst evolving sufficient heat in the presence of escaped gas to destroy said fusible means whereby to interrupt said control circuit to close said valve, and an electric heater for heating the catalyst independently of the action of escaping gas to a temperature which is high enough to prevent the condensation of moisture on said catalyst but which is below the ignition temperature of the gas.

8. A safety device of the character described comprising a gas system including a flow control valve connected between a gas supply and a gas utilizing device, means biasing said valve to the closed position thereof to discontinue the flow of gas between said supply and said device, a normally energized control circuit including electromagnetic means for retaining said valve in the open position thereof, fusible means in series circuit with said electromagnetic means, and means for exposing a catalyst to escaped gas from said system, said fusible means being disposed in heat exchange relation with said catalyst, said catalyst evolving sufficient heat in the presence of escaped gas to destroy said fusible means whereby to interrupt said control circuit to close said valve, and an electric heater for heating the catalyst independently of the action of escaping gas to a temperature which is high enough to prevent the condensation of moisture on said catalyst but which is below the ignition temperature of the gas, said fusible means being in series circuit with said electric heater, whereby to discontinue the energization of the heater when the valve is closed.

9. A safety device of the character described comprising a gas system including a flow control valve connected between a gas supply and a gas utilizing device, means biasing said valve to the closed position thereof to discontinue the flow of gas between said supply and said device, a normally energized control circuit for retaining said valve in the open position thereof, fusible means connected in series in said control circuit, means for exposing a catalyst to escaped gas from said system, said fusible means being disposed in heat exchange relation with said catalyst, said catalyst evolving sufficient heat in the presence of escaped gas to destroy said fusible means whereby to interrupt said control circuit to close said valve, and an electric heater for heating the catalyst independently of the action of escaping gas to a temperature which is high enough to prevent the condensation of moisture on said catalyst but which is below the ignition temperature of the gas.

References Cited in the file of this patent

UNITED STATES PATENTS

| Number | Name | Date |
|---|---|---|
| 252,849 | Redding | Jan. 24, 1882 |
| 268,908 | Kitsee | Dec. 12, 1882 |
| 606,076 | Ovenden | June 21, 1898 |
| 1,118,269 | Creveling | Nov. 24, 1914 |
| 1,118,942 | Lyon | Dec. 1, 1914 |
| 1,242,575 | Milano | Oct. 9, 1917 |
| 1,421,720 | Roberts | July 4, 1922 |
| 1,467,911 | Arendt et al. | Sept. 11, 1923 |
| 2,114,401 | Price | Apr. 19, 1938 |
| 2,162,314 | Perri | June 13, 1939 |
| 2,240,812 | Sparrow | May 6, 1941 |
| 2,306,509 | Talmey | Dec. 29, 1942 |
| 2,427,444 | Colombo | Sept. 16, 1947 |
| 2,505,730 | Betz | Apr. 25, 1950 |
| 2,508,588 | Waltman | May 23, 1950 |
| 2,532,214 | Willenborg | Nov. 28, 1950 |
| 2,533,339 | Willenborg | Dec. 12, 1950 |
| 2,535,950 | Page | Dec. 26, 1950 |